United States Patent
Jozefowicz et al.

(10) Patent No.: US 8,234,055 B2
(45) Date of Patent: Jul. 31, 2012

(54) ENGINE MOVEMENT DETECTION SYSTEMS AND METHODS

(75) Inventors: Kelly T. Jozefowicz, Highland, MI (US); John A. Jacobs, Fenton, MI (US)

(73) Assignee: GM Global Technology Operations LLC

(*) Notice: Subject to any disclaimer, the term of this patent is extended or adjusted under 35 U.S.C. 154(b) by 300 days.

(21) Appl. No.: 12/207,769

(22) Filed: Sep. 10, 2008

(65) Prior Publication Data

US 2009/0216420 A1 Aug. 27, 2009

Related U.S. Application Data

(60) Provisional application No. 61/031,117, filed on Feb. 25, 2008.

(51) Int. Cl.
*G06F 19/00* (2011.01)
*G06G 7/70* (2006.01)

(52) U.S. Cl. .................... 701/114; 701/102

(58) Field of Classification Search .................... 701/102, 701/110, 113, 114; 702/183, 185; 123/480, 123/491; 73/144.25, 114.26, 114.27, 114.28
See application file for complete search history.

(56) References Cited

U.S. PATENT DOCUMENTS

| | | | | |
|---|---|---|---|---|
| 4,375,672 A * | 3/1983 | Kato et al. | | 701/102 |
| 4,534,244 A * | 8/1985 | Hiramatsu | | 477/164 |
| 4,794,790 A * | 1/1989 | Margarit-Metaxa et al. | | 73/114.39 |
| 4,932,379 A * | 6/1990 | Tang et al. | | 123/436 |
| 5,154,055 A * | 10/1992 | Nakane et al. | | 60/276 |
| 6,418,899 B1 * | 7/2002 | Bluemel et al. | | 123/179.3 |
| 6,674,261 B2 * | 1/2004 | Takahashi et al. | | 318/721 |
| 6,820,602 B1 * | 11/2004 | Masters et al. | | 123/609 |
| 6,839,621 B2 * | 1/2005 | Kaneko | | 701/112 |
| 7,685,994 B2 * | 3/2010 | Mashiki et al. | | 123/347 |
| 2002/0013655 A1 * | 1/2002 | Amano et al. | | 701/112 |
| 2004/0127109 A1 * | 7/2004 | Matsuda | | 440/1 |
| 2005/0090968 A1 * | 4/2005 | Sato | | 701/114 |
| 2005/0234631 A1 * | 10/2005 | Nomura | | 701/102 |
| 2007/0163556 A1 * | 7/2007 | Holm et al. | | 123/631 |
| 2009/0216420 A1 * | 8/2009 | Jozefowicz et al. | | 701/102 |
| 2010/0082296 A1 * | 4/2010 | Tracey | | 702/183 |

* cited by examiner

*Primary Examiner* — Stephen K Cronin
*Assistant Examiner* — Sizo Vilakazi

(57) ABSTRACT

A control system for an internal combustion engine is provided. The control system includes an engine movement module that selects from N engine rotation modes based on camshaft movement and crankshaft movement, where N is an integer greater than two, and where at least one of the N rotation modes is an assisted spinning mode. A diagnostic module enables one or more engine diagnostic modes based on the selected engine rotation mode.

15 Claims, 3 Drawing Sheets

ENGINE MOVEMENT DETECTION SYSTEMS AND METHODS

FIELD

The present invention relates to systems and methods for detecting engine movement of an internal combustion engine.

BACKGROUND

The statements in this section merely provide background information related to the present disclosure and may not constitute prior art.

An internal combustion engine includes an intake camshaft that controls the flow of air entering the engine. The air is combined with fuel and combusted within a cylinder. The combustion drives a piston which, in turn, drives a crankshaft to produce drive torque. Exhaust gas from the combustion exits the engine by control of an exhaust camshaft.

One or more sensors detect rotation of the camshafts and/or the crankshaft. Sensor signals indicate whether the engine is rotating and thus, operational. Diagnostics are performed to confirm operation of the sensors and the engine. In some cases, the diagnostics do not run when the engine is starting to rotate, which may prevent the engine from starting. In other cases, the diagnostics set faults when the engine stops rotating. This may result in improper detection of faults, which may impact drivability.

SUMMARY

Accordingly, a control system for an internal combustion engine is provided. The control system includes an engine movement module that selects from N engine rotation modes based on camshaft movement and crankshaft movement, where N is an integer greater than two, and where at least one of the N rotation modes is an assisted spinning mode. A diagnostic module enables one or more engine diagnostic modes based on the selected engine rotation mode.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
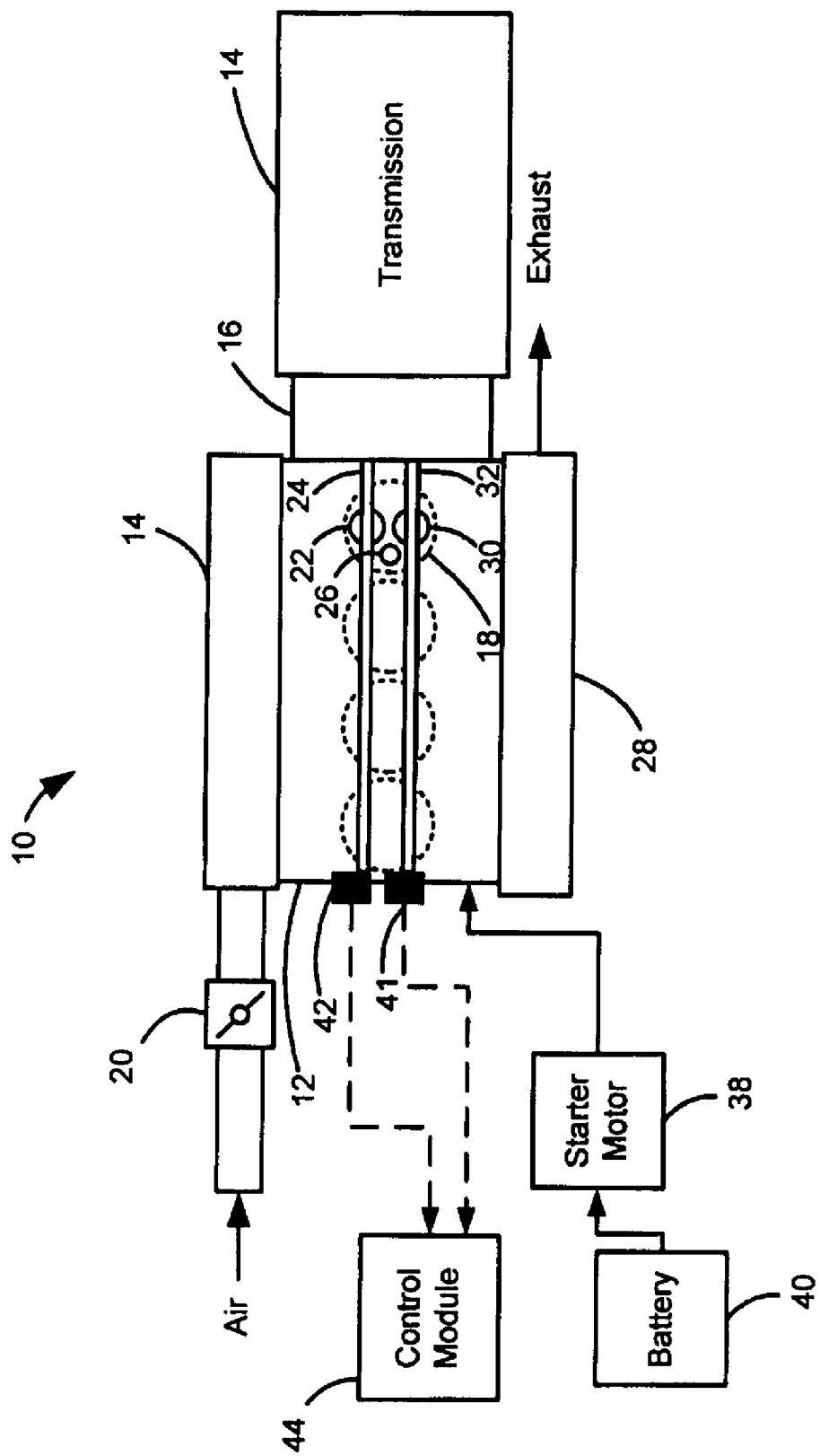
FIG. 1 is a functional block diagram of a vehicle including an engine movement detection system according to various aspects of the present disclosure.

The following description is merely exemplary in nature and is not intended to limit the present disclosure, application, or uses. It should be understood that throughout the drawings, corresponding reference numerals indicate like or corresponding parts and features. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Referring now to FIG. 1, an exemplary vehicle 10 includes an engine 12 that drives a transmission 14. The transmission 14 can be either an automatic or a manual transmission that is driven by the engine 12 through a corresponding torque converter or clutch 16. The engine 12 includes N cylinders 18. Although FIG. 1 depicts four cylinders (N=4), it can be appreciated that the engine 12 may include additional or fewer cylinders 18. For example, engines having 4, 5, 6, 8, 10, 12, and 16 cylinders are contemplated. Air flows into the engine 12 through a throttle 20 and is combusted with fuel in the cylinders 18.

The engine 12 includes a fuel injector (not shown) that injects fuel that is combined with the air as it is drawn into the cylinder 18 through an intake port. An intake valve 22 selectively opens and closes to enable the air/fuel mixture to enter the cylinder 18. The intake valve position is regulated by an intake camshaft 24. A piston (not shown) compresses the air/fuel mixture within the cylinder 18. A spark plug 26 initiates combustion of the air/fuel mixture, driving the piston in the cylinder 18. The piston drives a crankshaft (not shown) to produce drive torque. Combustion exhaust within the cylinder 18 is forced out through an exhaust manifold 28 when an exhaust valve 30 is in an open position. The exhaust valve position is regulated by an exhaust camshaft 32. The exhaust is treated in an exhaust system (not shown). Although single intake and exhaust valves 22,30 are illustrated, it can be appreciated that the engine 12 can include multiple intake and exhaust valves 22,30 per cylinder 18.

The vehicle 10 further includes a starter motor 38 and a battery 40. The starter motor 38 operates in a motor mode. When operating in the motor mode, the starter motor 38 is powered by the battery 40. The starter motor 38 provides positive torque to assist the engine 12 to turn or crank until the engine 12 can operate under its own power. As can be appreciated, the battery 40 can power other vehicle components in addition to the starter motor 38.

A camshaft position sensor 41 generates a camshaft position signal based on a rotation of either the intake camshaft 24 or the exhaust camshaft 32, or both. A crankshaft position sensor 42 generates a crankshaft position signal based on a rotation of the crankshaft (not shown). A control module 44 receives the above mentioned signals and detects movement of the engine 12 based one the engine movement detection methods and systems of the present disclosure. The control module 44 then, more properly, performs diagnostic methods based on the engine movement detection methods and systems of the present disclosure.

Generally speaking, the engine movement detection methods and systems recognize the relationships between camshaft movement, crankshaft movement, starter motor engagement, and methods for diagnosing the engine. Based on the relationships, the engine movement detection methods and systems determine an operating mode of the engine 12 to be one of, for example, beginning to rotate, producing power, and stopping rotation. Based on the operating mode of the engine, the control module 44 can enable engine diagnostic methods appropriately. For example, the control module 44 can disable the diagnostic methods when the engine 12 is coming to a stop. The control module 44 can perform the diagnostic methods when the engine 12 is starting. The control module 44 can report that the engine 12 is moving when the crankshaft position sensor 42 is not correctly reporting edges.

Figure 2:
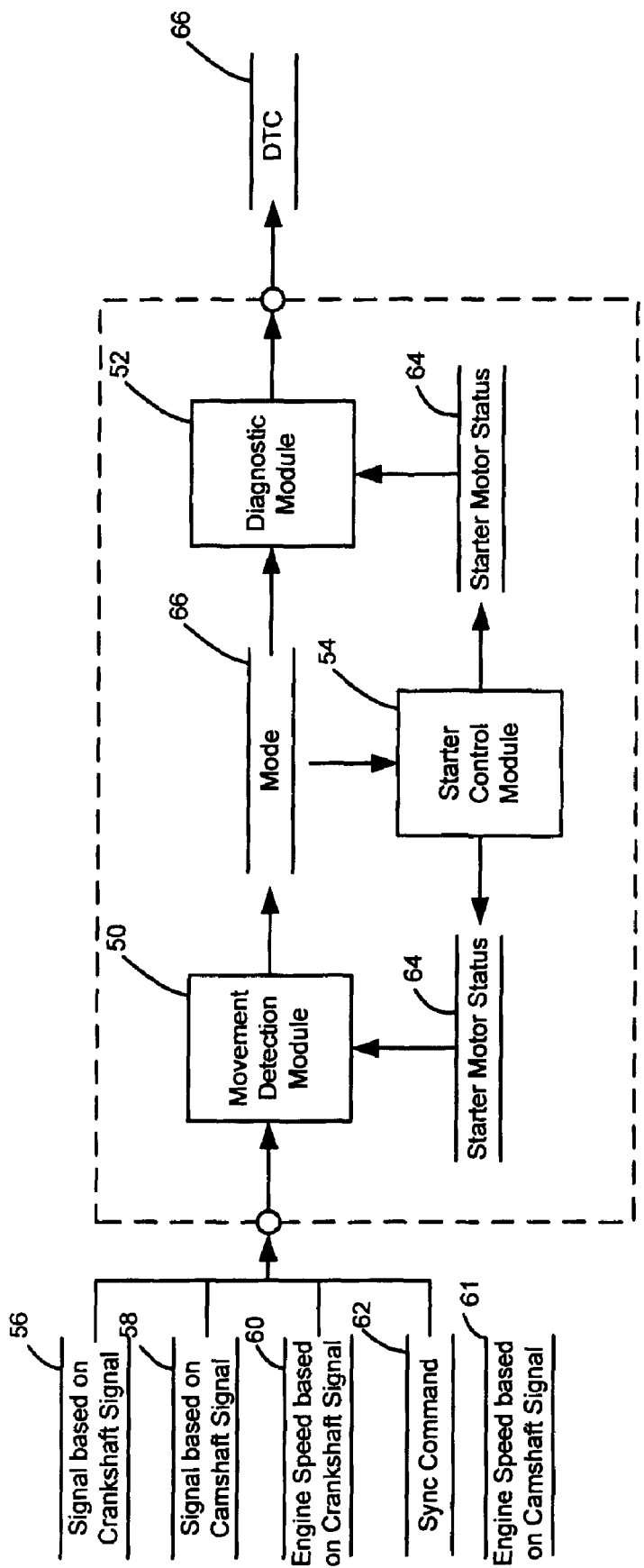
FIG. 2 is a dataflow diagram illustrating an engine movement detection system according to various aspects of the present disclosure.

Referring now to FIG. 2, a dataflow diagram illustrates various embodiments of an engine movement detection system 46 that may be embedded within the control module 44. Various embodiments of engine movement detection systems 46 according to the present disclosure may include any number of sub-modules embedded within the control module 44. As can be appreciated, the sub-modules shown may be combined and/or further partitioned to similarly detect engine movement and diagnose faults. Inputs to the engine movement detection system 46 may be sensed from the vehicle 10 (FIG. 1), received from other control modules (not shown) within the vehicle 10 (FIG. 1), and/or determined by other sub-modules (not shown) within the control module 44. In various embodiments, the control module of FIG. 2 includes a movement detection module 50, a diagnostic module 52, and a starter control module 54.

Figure 3:
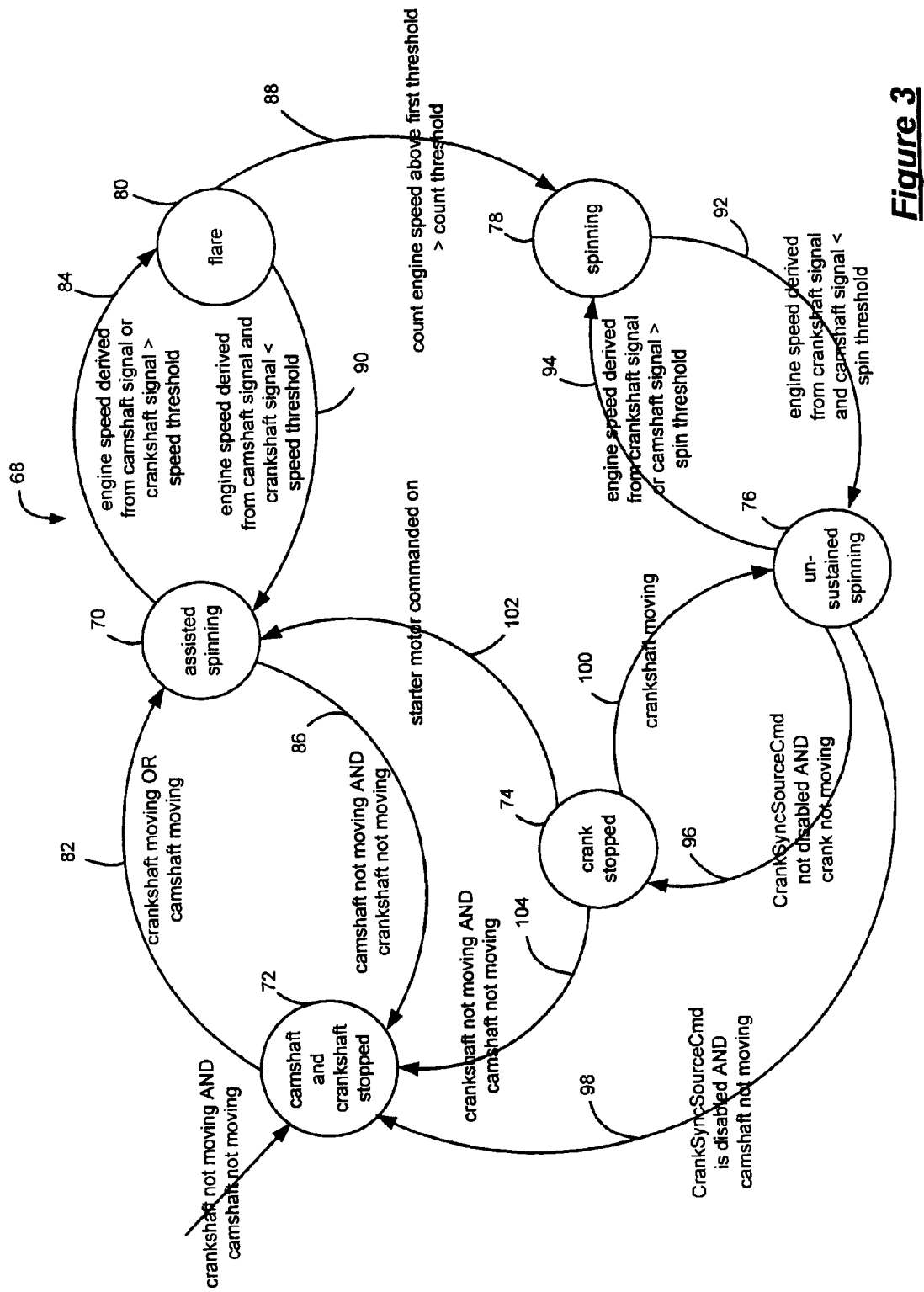
FIG. 3 is a state transition diagram illustrating an engine movement detection model according to various aspects of the present disclosure.

The movement detection module 50 receives as input a crankshaft signal 56, a camshaft signal 58, an engine speed signal that may be derived from a crankshaft signal 60, an engine speed that may be derived from camshaft signal 61, a sync command 62, and a starter motor status 64. The movement detection module 50 determines an engine operating mode 66 based on an engine movement detection model 68. As shown in FIG. 3, a state transition diagram illustrates an engine movement detection model 68 that can be implemented within the movement detection module 50 (FIG. 2). The engine movement detection model 68 can include one or more states. Each state can represent a particular operating mode of the engine, for example, the states can be, but are not limited to, 'assisted spinning' mode 70, 'camshaft and crankshaft stopped' mode 72, 'crankshaft stopped' mode 74, 'un-sustained spinning' mode 76, 'spinning' mode 78, and 'flare' mode 80.

Transitions between each state are governed by one or more transition conditions. In one example, the state can begin at the 'camshaft and crankshaft stopped' mode 72 when the crankshaft signal 56 (FIG. 2) indicates that the crankshaft is not moving and the camshaft signal 58 (FIG. 2) indicates that the camshaft 24 or 32 (FIG. 1) is not moving. The state can transition at 82 from the 'camshaft and crankshaft stopped' mode 72 to the 'assisted spinning' mode 70 when the crankshaft signal 56 (FIG. 2) indicates that the crankshaft has begun moving or the camshaft signal 58 (FIG. 2) indicates that the camshaft has begun moving. The state can transition at 84 from the 'assisted spinning' mode 70 to the 'flare' mode 80 when the engine speed derived from crankshaft sensor 60 (FIG. 2) or engine speed derived from the camshaft sensor 61 is greater than an engine speed threshold. Otherwise, the state can transition at 86 back to the 'camshaft and crankshaft stopped' mode 72 when both the camshaft signal 58 (FIG. 2) indicates that the camshaft is not moving and the crankshaft signal 56 (FIG. 2) indicates that the crankshaft is not moving.

The state can transition at 88 from the 'flare' mode 80 to the 'spinning' mode 78 when the engine speed derived from crankshaft sensor 60 (FIG. 2) has been above the engine speed threshold for a predetermined amount of time (e.g., greater than a time or count threshold) or a predetermined number of cylinder events. Otherwise, the state can transition at 90 from the 'flare' mode 80 back to the 'assisted spinning' mode 70 when the engine speed derived from crankshaft sensor 60 (FIG. 2) and the engine speed derived from camshaft sensor 61 drops below the engine speed threshold.

The state can transition at 92 from the 'spinning' mode 78 to the 'un-sustained spinning' mode 76 when the engine speed derived from crankshaft sensor 60 (FIG. 2) and the engine speed derived from camshaft sensor 61 are both less than an engine speed threshold. The state can transition at 94, 96, or 98 from the 'un-sustained spinning' mode 76 to one of the 'spinning' mode 78, the 'crankshaft stopped' mode 74, and the 'camshaft and crankshaft stopped' mode 72. For example, the state can transition at 94 from the 'un-sustained spinning' mode 76 back to the 'spinning' mode 78 when the engine speed derived from crankshaft sensor 60 (FIG. 2) or the engine speed derived from camshaft sensor 61 rises above an engine speed threshold. The state can transition at 96 from the 'un-sustained spinning' mode 76 to the 'crankshaft stopped' mode 74 when the crankshaft signal 56 (FIG. 2) indicates that the crankshaft is not moving and the "crank sync source command" 62 (FIG. 2) is not disabled. The state can transition at 98 from the 'un-sustained spinning' mode 76 to the 'camshaft and crankshaft stopped' mode 72 when the "crank sync source command" 62 (FIG. 2) is disabled and the camshaft signal 58 (FIG. 2) indicates that the camshaft is not moving.

The state can transition from the 'crankshaft stopped' mode 74 to one of the 'un-sustained spinning' mode 76, the 'assisted spinning' mode 70, and the 'camshaft and crankshaft stopped' mode 72. For example, the state can transition at 100 from the 'crankshaft stopped' mode 74 to the 'un-sustained spinning' mode 76 when the crankshaft signal 56 (FIG. 2) indicates that the crankshaft is now moving. The state can transition at 102 from the 'crankshaft stopped' mode to the 'assisted spinning' mode when the starter motor 38 is commanded on. The state can transition at 104 from the 'crankshaft stopped' mode 74 to the 'camshaft and crankshaft stopped' mode 72 when the crankshaft signal 56 (FIG. 1) indicates that the crankshaft is not moving and the camshaft signal 58 (FIG. 1) indicates that the camshaft is not moving.

Referring back to FIG. 2, the starter control module 54 commands the starter motor 38 (FIG. 1) to run based on the engine operating mode 66. For example, once the starter motor 38 (FIG. 1) has been commanded on, the starter control module 54 keeps the starter motor 38 (FIG. 1) engaged. The diagnostic module 52 performs one or more engine diagnostic methods based on the starter motor status 64 and the engine operating mode 66. For example, starter motor engagement is needed to allow the diagnostic module to detect either a fault in the camshaft position sensor 41 or crankshaft position sensor 42.

As can be appreciated, the engine movement detection model operates correctly when either of the crankshaft sensor or camshaft sensor is not available due to a fault.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, specification, and the following claims.

What is claimed is:

1. A control system for an internal combustion engine, comprising:
   an engine movement module that selects from N engine rotation modes based on camshaft movement and crankshaft movement, where N is an integer greater than two, and where at least one of the N rotation modes is an assisted spinning mode; and
   a diagnostic module that enables one or more engine diagnostic modes based on the selected engine rotation mode.

2. The system of claim 1 wherein the engine movement module selects the assisted spinning mode when one of the camshaft movement and the crankshaft movement is detected.

3. The system of claim 1 wherein the engine movement module selects from the N engine rotation modes based on engine speed and camshaft speed.

4. The system of claim 1 wherein the engine movement module selects from the N engine rotation modes based on a starter motor operational state.

5. The system of claim 1 wherein the engine movement module selects from the N engine rotation modes based on a current engine rotation mode.

6. The system of claim 1 wherein at least one of the N rotation modes is a flare mode.

7. The system of claim 1 wherein at least one of the N rotation modes is an un-sustained spinning mode.

8. The system of claim 1 wherein at least one of the N rotation modes is a crank stopped mode.

9. The system of claim 1 wherein at least one of the N rotation modes is a spinning mode.

10. A method of detecting rotation of an engine, comprising:

selecting from N engine rotation modes based on camshaft movement and crankshaft movement, where N is an integer greater than two, and where at least one of the N rotation modes is an assisted spinning mode; and enabling one or more engine diagnostic modes based on the selected engine rotation mode.

11. The method of claim 10 wherein the selecting comprises selecting the assisted spinning mode when one of camshaft movement and crankshaft movement is detected.

12. The method of claim 10 where at least one of the N rotation modes is a flare mode and wherein the selecting comprises selecting the flare mode based on engine speed derived from crankshaft sensor and engine speed derived from camshaft sensor.

13. The method of claim 10 where at least one of the N rotation modes is a spinning mode and wherein the selecting comprises selecting the spinning mode based on based on engine speed and a number of cylinders experiencing combustion.

14. The method of claim 10 where at least one of the N rotation modes is an un-sustained spinning mode and wherein the selecting comprises selecting the un-sustained spinning mode based on engine speed derived from a crankshaft shaft signal and engine speed derived from camshaft speed.

15. The method of claim 10 wherein the selecting comprises selecting from the N engine rotation modes based on a current engine rotation mode.

* * * * *